United States Patent [19]
Otaka et al.

[11] Patent Number: 5,326,548
[45] Date of Patent: Jul. 5, 1994

[54] FIBROUS ANHYDROUS MAGNESIUM OXYSULFATE AND PROCESS FOR THE PREPARATION THEREOF

[75] Inventors: Satoshi Otaka, Yamaguchi; Tadashi Matsunami; Yukio Tasaka, both of Ube, all of Japan

[73] Assignee: Ube Industries, Ltd., Ube, Japan

[21] Appl. No.: 868,119

[22] Filed: Apr. 14, 1992

[30] Foreign Application Priority Data

Apr. 16, 1991 [JP] Japan .................................. 3-173481

[51] Int. Cl.$^5$ ................................................ C01F 5/40
[52] U.S. Cl. ...................................... 423/554; 106/461
[58] Field of Search ....................... 423/164, 166, 554; 23/304; 106/461

[56] References Cited

U.S. PATENT DOCUMENTS

| | | | |
|---|---|---|---|
| 3,506,465 | 4/1970 | Popielinski et al. | 423/554 |
| 4,246,254 | 1/1981 | Miyata et al. | 423/639 |
| 4,505,887 | 3/1985 | Miyata et al. | 423/635 |
| 5,021,226 | 1/1991 | Ueno et al. | 423/554 |
| 5,082,646 | 1/1992 | Ueno et al. | 423/554 |

FOREIGN PATENT DOCUMENTS

| | | | |
|---|---|---|---|
| 56-149318 | 11/1981 | Japan | 423/554 |
| 61-256920 | 11/1986 | Japan | 423/554 |
| 1-179717 | 7/1989 | Japan | 423/554 |
| 1-308821 | 12/1989 | Japan | 423/554 |
| 3-122012 | 5/1991 | Japan | 423/554 |
| 3-122013 | 5/1991 | Japan | 423/554 |

OTHER PUBLICATIONS

Japanese Patent Abstract, vol. 9, No. 104 (C-279) (1827), May 8, 1985, corresponding to Japanese Patent Appln. No. 58-101666.

Japanese Patent Abstract, vol. 6, No. 31 (C-92) (909), Feb. 24, 1982, corresponding to Japanese Patent Appln. No. 55-62364.

Japanese Patent Abstract, vol. 13, No. 372 (C-627) (3720), Aug. 17, 1989, corresponding to Japanese Patent Appln. No. 62-282,122.

European Search Report of Application No. 92 10 6489, dated Jun. 30, 1992.

*Primary Examiner*—Gary P. Straub
*Attorney, Agent, or Firm*—Finnegan, Henderson, Farabow, Garrett and Dunner

[57] ABSTRACT

A fibrous anhydrous magnesium oxysulfate having a rational formula of $MgSO_4.5Mg(OH)_2$ has an excellent oil absorptivity and appropriate hygroscopicity. The fibrous anhydrous magnesium oxysulfate is prepared by a process comprising cooling and diluting, with water or an aqueous solution of magnesium sulfate, a slurry of magnesium oxysulfate having a rational formula of $2MgSO_4.Mg(OH)_2.3H_2O$, obtained by dispersing magnesium hydroxide or magnesium oxide into an aqueous solution of magnesium sulfate, and then subjecting the dispersion to hydrothermal reaction, to thereby decompose the $2MgSO_4.Mg(OH)_2.3H_2O$ and produce fibrous magnesium oxysulfate having a rational formula of $MgSO_4.5Mg(OH)_2.8H_2)$, and then heat-treating the fibrous magnesium oxysulfate having the rational formula of $MgSO_4.5Mg(OH)_2.8H_2O$.

11 Claims, 3 Drawing Sheets

FIBROUS ANHYDROUS MAGNESIUM OXYSULFATE AND PROCESS FOR THE PREPARATION THEREOF

BACKGROUND OF THE INVENTION

1. Field of the Invention

The present invention relates to anhydrous fibrous magnesium oxysulfate and a process for the preparation thereof. This anhydrous fibrous magnesium oxysulfate may be suitably utilized as an additive for a resin, filler or filter medium, due to the fibrous structure thereof.

2. Description of the Related Art

Magnesium oxysulfates with different structures are known, and fibrous $MgSO_4.5Mg(OH)_2.3H_2O$ is already in use as a reinforcing material for resins, and the like. Further, $MgSO_4.5Mg(OH)_2.8H_2O$ also has a fibrous structure, and as a process for the preparation thereof, there is known a process for synthesizing same directly from magnesium oxide and magnesium sulfate. This process, however, is unsatisfactory in various aspects, such as conversion and production cost, when producing this compound on an industrial scale. These fibrous magnesium sulfates contain water of crystallization in the structures thereof, as apparent from the rational formulae thereof, but are dehydrated at a temperature of from 100° to 300° C., resulting in defective moldings when used for resins to be processed at a temperature exceeding this temperature range.

SUMMARY OF THE INVENTION

The present inventors made intensive studies into improvements in the thermal resistance of such a fibrous magnesium oxysulfate, and improvements in the conversion thereof when producing $MgSO_4.5Mg(OH)_2.8H_2O$, as well as a reduction of the cost, and as a result, found that, by using $2MgSO_4.Mg(OH)_2.3H_2O$, a kind of magnesium oxysulfate, as a reaction intermediate substance, a fibrous $MgSO_4.5Mg(OH)_2.8H_2O$ may be obtained from magnesium oxide or the more inexpensive magnesium hydroxide as a magnesium raw material, with a high conversion and in a short time starting, and that when the thus obtained fibrous $MgSO_4.5Mg(OH)_2.8H_2O$ is heat-treated at an appropriate temperature, there is obtained a hitherto unknown fibrous magnesium oxysulfate having the rational formula of $MgSO_4.5Mg(OH)_2$ free water of crystallization, and thus the present inventors accomplished the present invention.

Therefore, according to the present invention, magnesium hydroxide or magnesium oxide is a first dispersed in an aqueous solution of magnesium sulfate, and then a hydrothermal reaction is carried out to synthesize a slurry of $2MgSO_4.Mg(OH)_2.3H_2O$ as a reaction intermediate substance.

Subsequently, a required amount of water or an aqueous solution of magnesium sulfate is added to the thus obtained slurry, so that the mixture is rapidly cooled and diluted to decompose $2MgSO_4.Mg(OH)_2.3H_2O$, whereby a fibrous $MgSO_4.5Mg(OH)_2.8H_2O$ is obtained.

Further, when the thus obtained $MgSO_4.5Mg(OH)_2.8H_2O$ is heat treated, $MgSO_4.5Mg(OH)_2$ with a high heat resistance temperature may be obtained, which is free from water or crystallization.

DESCRIPTION OF THE PREFERRED EMBODIMENTS

Figure 1:
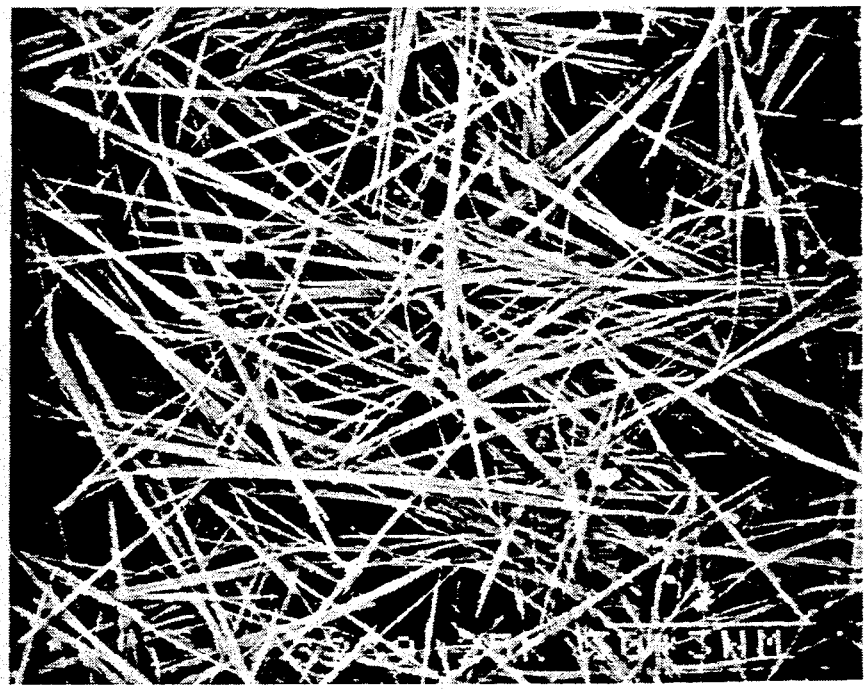
FIG. 1 is a scanning electron microscopic photograph illustrating the shapes of fibers of the $MgSO_4.5Mg(OH)_2.8H_2O$ obtained in Example 2.

The present invention will be further illustrated below.

First, magnesium hydroxide or magnesium oxide is dispersed in an aqueous solution of magnesium sulfate. When the amount of the dispersed magnesium hydroxide or magnesium oxide is too large, the viscosity of the produced slurry of $2MgSO_4.Mg(OH)_2.3H_2O$ becomes too high and it becomes difficult to stir the slurry. Accordingly, magnesium hydroxide or magnesium oxide is dispersed such that the concentration thereof is not higher than 10% by weight, preferably between 1 and 5% by weight.

The concentration of the aqueous solution of magnesium sulfate, into which magnesium hydroxide or magnesium oxide is to be dispersed, varies depending upon the reaction temperature and the concentration of the magnesium hydroxide or that of the magnesium oxide, and the concentration is adjusted to a value of between 1.5 and 5.0 mol/l, preferably between 2.0 and 4.0 mol/l. When the concentration of the magnesium sulfate is lower than 1.5 mol/l, a high reaction temperature is required and the stability of the produced $2MgSO_4.Mg(OH)_2.3H_2O$ is worsened. On the contrary, if the concentration of the magnesium sulfate exceeds 5.0 mol/l, this is not preferable for economical reasons. Therefore, preferably the magnesium sulfate and magnesium hydroxide coexist in the reaction system, and the required magnesium sulfate also may be obtained from sulfuric acid and magnesium hydroxide.

The temperature of the hydrothermal reaction is between 100° and 200° C., preferably between 130° and 180° C., and the pressure is between 1 and 15 kg/cm², preferably between 3 and 10 kg/cm². When the reaction temperature is lower than 100° C., the concentration of the required magnesium sulfate becomes higher and reaction time becomes longer. If the reaction temperature exceeds 200° C., this is not preferable from the economical point of view.

In addition, since this reaction is a solid-liquid reaction, it is preferably carried out under stirring such that the solid phase and the liquid phase are in sufficient contact, and the reaction time is suitably between 0.1 and 5 hours, although this can vary depending on the reaction conditions.

The thus obtained $2MgSO_4.Mg(OH)_2.3H_2O$ is an unstable needle-like compound with a length of from several $\mu$ to 30 $\mu$ and a diameter of from 0.1 $\mu$ to 10 $\mu$. This compound is used as a reaction intermediate product in the present invention.

$2MgSO_4.Mg(OH)_2.3H_2O$ is decomposed, while lowering of the concentration and temperature of the aqueous solution of magnesium sulfate, and converted into $MgSO_4.5Mg(OH)_2.3H_2O$, $Mg(OH)_2$, $MgSO_4.5Mg(OH)_2.8H_2O$, $MgSO_4.3Mg(OH)_2.8H_2O$ and the like.

Since the compound to be produced depends upon the concentration and temperature of the aqueous solution of magnesium sulfate, and optional compound may be obtained by adjusting the concentration and temperature of the aqueous solution of magnesium sulfate, but to obtain each optional compound independently, it is necessary to consider the stability of $2MgSO_4.Mg(OH)_2.3H_2O$. Namely, to obtain an objective compound, it is required to reduce the concentration of magnesium sulfate and the temperature of the slurry of $2MgSO_4.Mg(OH)_2.3H_2O$ to the production conditions of the compound, but if a long time is required for the operation, an unwanted compound is produced midway in the process. Especially, at a temperature lower than 100° C. the decomposition occurs rapidly, and thus an operation at a temperature lower than 100° C. should be conducted in as short a time as possible. As a result of the present inventors' intensive study, this problem has been settled by adding a required amount of water or an aqueous solution of magnesium sulfate to the slurry of $2MgSO_4.Mg(OH)_2.3H_2O$, to rapidly dilute and cool the obtained mixture. The concentration and temperature of water or aqueous solution of magnesium sulfate to be added to the slurry of $2MgSO_4.Mg(OH)_2.3H_2O$ are depend upon the concentration of magnesium sulfate, the temperature or the like of the slurry of the synthesized $2MgSO_4.Mg(OH)_2.3H_2O$.

The second reaction intermediate substance in the present invention, $MgSO_4.5Mg(OH)_2.8H_2O$, may be suitably prepared by adding a required amount of water or aqueous solution of magnesium sulfate to the obtained slurry of $2MgSO_4.Mg(OH)_2.3H_2O$ such that the concentration of magnesium sulfate is between 0.5 and 2.5 mol/l, preferably between 0.7 and 2.3 mol/l, and the temperature is between 10° and 60° C., preferably between 20° and 50° C., to thereby decompose the composed. If the concentration and temperature of magnesium sulfate are outside the above range, an unwanted compound may be produced, which is not preferable. Although the reaction time varies depending on the reaction conditions, it is between 2 and 10 hours, in general. The reaction time may be reduced by using seed crystals, if necessary. In this case, not only is the reaction time shortened to between 1 and 5 hours, but also there is produced a reaction product with a more complete fibrous structure compared with the reaction product obtained without using seed crystals, and thus favorable results are obtained.

The thus obtained $MgSO_4.5Mg(OH)_2.8H_2O$ assumes a state of fibers with a length of several to 1000 μ and a diameter of from 0.1 to 10 μ, said compound having an apparent density of from 0.05 to 0.3 g/cm$^3$ and a BET superficial area not larger than 30 m$^2$/g, and has an excellent oil absorptivity and appropriate hygroscopicity.

Nevertheless, the fibrous $MgSO_4.5Mg(OH)_2.8H_2O$ contains 8 molecules of water of crystallization in the structure, as apparent from the rational formula, and as 2 molecules of water crystallization are removed at a temperature of about 100° C. and 6 molecules thereof are removed at about 160° C., this compound is not preferable as an additive for resins.

The present inventors made an intensive study and settled this problem by subjecting the fibrous $MgSO_4.5Mg(OH)_2.8H_2O$ to a heat treatment at a temperature of from 160° to 350° C., preferably from 170° to 300° C. for 0.5 to 10 hours, preferably 1 to 5 hours.

That is, by this heat treatment, there is obtained $MgSO_4.5Mg(OH)_2$ free from water of crystallization while the fibrous structure is maintained in its original state. By this treatment, the crystal structure of the compound is changed, and the compound does not again adsorb the dehydrated water of crystallization.

The anhydrous fibrous magnesium oxysulfate of the rational formula $MgSO_4.5Mg(OH)_2$ assumes approximately the same state of fibers as the fibrous $MgSO_4.5Mg(OH)_2.8H_2O$, the fibers having a length of from several to 1000 μ and a diameter of from 0.07 to 7 μ, and this fibrous compound has an apparent density of from 0.05 to 0.3 g/cm$^3$ and a BET superficial area not greater than 30 m$^2$/g, and has an excellent oil absorptivity and appropriate hygroscopicity.

The present invention will be further explained below with reference to working examples and comparative examples.

EXAMPLE 1

Magnesium sulfate heptahydrate was dissolved in water to prepare 1 l of a 3.0 mol/l aqueous solution of magnesium sulfate, and 40 g of magnesium hydroxide were added to the thus prepared solution and thoroughly dispersed thereinto. Subsequently, the thus obtained dispersion was introduced into an autoclave and a reaction was carried out for 2 hours at a temperature of 160° C. and under a pressure of 6 kg/cm$^2$.G, whereby $2MgSO_4.Mg(OH)_2.3H_2O$ was synthesized. After completion of the reaction, a slurry of the obtained $2MgSO_4.Mg(OH)_2.3H_2O$ was cooled to a temperature of 100° C., and 2 l of a 1.5 mol/l aqueous solution of magnesium sulfate of a temperature of 20° C. were added to the slurry, whereby the obtained solution was rapidly diluted and cooled to a concentration of 2.0 mol/l and to a temperature of 45° C., and then the reaction was carried out for 5 hours to obtain a fibrous substance.

After termination of the reaction, the reaction product was collected by filtration, washed with water and subjected to chemical analysis, and the product represented the rational formula of $MgSO_4.5Mg(OH)_2.8H_2O$.

The thus obtained fibrous $MgSO_4.5Mg(OH)_2.8H_2O$ was heat treated for 3 hours at a temperature of 170° C. The obtained substance was subjected to chemical analysis, and represented the rational formula of $MgSO_4.5Mg(OH)_2$.

EXAMPLE 2

Magnesium sulfate hepthydrated salt was dissolved in water to prepare 1 l of a 3.0 ml/l aqueous solution of magnesium sulfate, and 40 g of magnesium hydroxide were added to the thus prepared solution and thoroughly dispersed thereinto. Subsequently, the thus obtained dispersion was introduced into an autoclave and a reaction was carried out for 2 hours at a temperature of 160° C. and under a pressure of 6 kg/cm$^2$.G, whereby $2MgSO_4.Mg(OH)_2.3H_2O$ was synthesized. After the reaction, a slurry of the obtained $2MgSO_4.Mg(OH)_2.3H_2O$ was cooled to a temperature of 100° C., and 2 l of a 1.5 mol/l aqueous solution of magnesium sulfate of a temperature of 20° C. were added to the slurry, whereby the obtained solution was rapidly diluted and cooled to a concentration of 2.0 mol/l and to a temperature of 45° C. Then, $MgSO_4.5Mg(OH)_2.8H_2O$ synthesized in the same manner as in Example 1 was added as seed crystal to the solution, and the reaction was carried out for 2 hours, whereby a fibrous substance was obtained.

After the termination of the reaction, the reaction product was collected by filtration, washed with water and subjected to chemical analysis, the reaction product represented the rational formula of $MgSO_4.5Mg(OH)_2.8H_2O$.

FIG. 1 shows a scanning electron microscopic photograph (secondary electron image: 1000 times) of the thus obtained fibrous $MgSO_4.5Mg(OH)_2.8H_2O$. It can be clearly seen that the obtained $MgSO_4.5Mg(OH)_2.8H_2O$ assumes a state of fibrous crystals.

This fibrous $MgSO_4.5Mg(OH)_2.8H_2O$ was heat treated for 3 hours at a temperature of 170° C. When the obtained substance was subjected to chemical analysis, it represented the rational formula of $MgSO_4.5Mg(OH)_2$.

Figure 2:
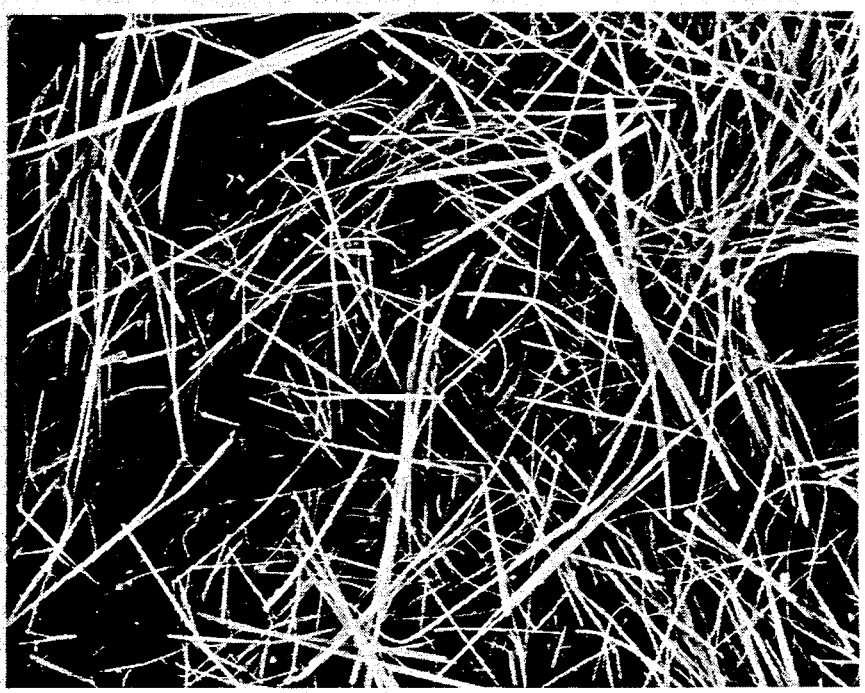
FIG. 2 is a scanning electron microscopic photograph illustrating the shapes of fibers of the $MgSO_4.5Mg(OH)_2$ obtained also in Example 2.
Figure 3:
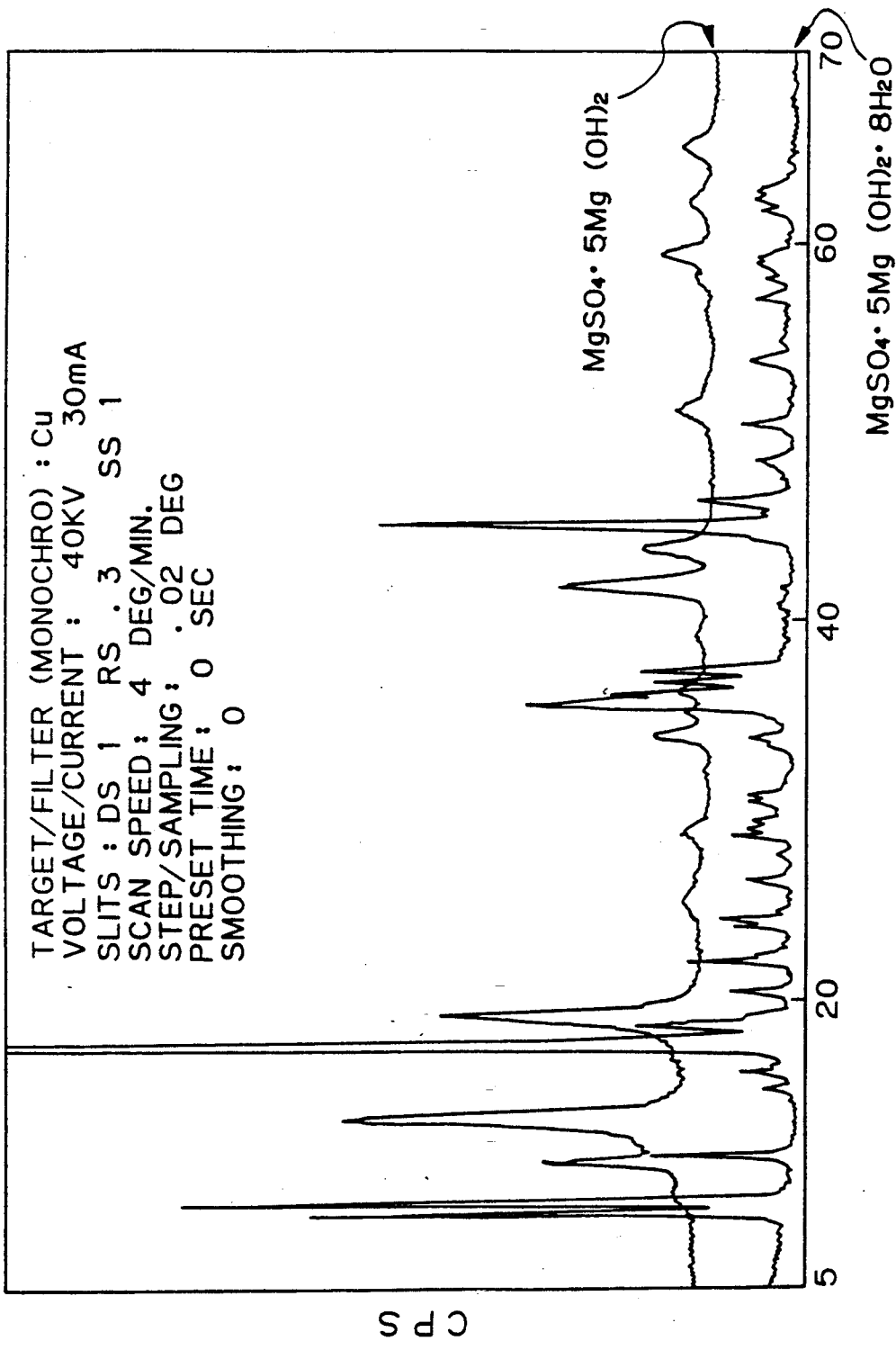
FIG. 3 shows X-ray diffraction patterns illustrating the crystal structures of $MgSO_4.5Mg(OH)_2.8H_2O$ and $MgSO_4.5Mg(OH)_2$ also obtained in Example 2; and, FIG. 4 is a scanning electron microscopic photograph illustrating the shapes of fibers of $MgSO_4.5Mg(OH)_2.8H_2O$ obtained in Comparative Example 1.

FIG. 2 shows a scanning electron microscopic photograph (secondary electron image: 1000 times) of the thus obtained fibrous $MgSO_4.5Mg(OH)_2$, and FIG. 3 shows X-ray diffraction patterns thereof before and after the heat treatment.

It can be seen that, by the heat treatment, the crystals of this compound are changed to have a different crystal structure without losing the fibrous shape of the fibrous $MgSO_4.5Mg(OH)_2.8H_2O$.

COMPARATIVE EXAMPLE 1

Magnesium sulfate heptahydrate was dissolved in water to prepare 1 l of a 2.0 mol/l aqueous solution of magnesium sulfate, and 9 g of magnesium oxide were added to the thus prepared solution. Then, the reaction was carried out for 12 hours at a temperature of 45° C., so that the reaction product represented the rational formula of $MgSO_4.5Mg(OH)_2.8H_2O$.

Figure 4:
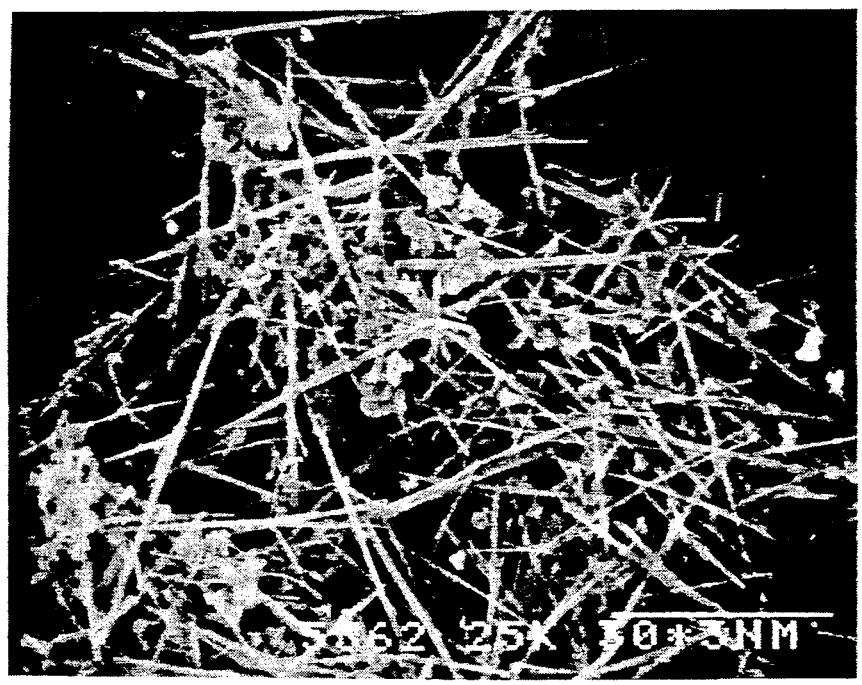

FIG. 4 shows a scanning electron microscopic photograph (secondary electron image: 1000 times) of the thus obtained fibrous $MgSO_4.5Mg(OH)_2.8H_2O$. The obtained fibrous $MgSO_4.5Mg(OH)_2.8H_2O$ contains many granular different phases (MgO, $Mg(OH)_2$).

COMPARATIVE EXAMPLE 2

Magnesium sulfate heptahydrate was dissolved in water to prepare 1 l of a 2.0 mol/l aqueous solution of magnesium sulfate, and 13 g of magnesium oxide were added to the thus prepared solution and thoroughly dispersed. Then, the reaction was carried out for 24 hours at a temperature of 45° C., and no fibrous substance was obtained. A chemical analysis was conducted and it was found that the magnesium hydroxide remained unchanged.

COMPARATIVE EXAMPLE 3

Magnesium sulfate heptahydrate was dissolved in water to prepare 1 l of a 2.0 mol/l aqueous solution of magnesium sulfate, and 13 g of magnesium oxide were added to the thus prepared solution and thoroughly dispersed. Subsequently, the obtained dispersion was introduced into an autoclave and the reaction was carried out for 2 hours at a temperature of 160° C. and under a pressure of 6 kg/cm².G, whereby $2MgSO_4.Mg(OH)_2.3H_2O$ was synthesized.

After the termination of the reaction, a slurry of $2MgSO_4.Mg(OH)_2.3H_2O$ was allowed to cool over 2 hours from 160° C. to 45° C. and the reaction was carried out for 5 hours, and no fibrous substance was obtained but a granular material was produced. The obtained material was subjected to chemical analysis and found to be magnesium hydroxide.

Although it is known that a fibrous magnesium oxysulfate having the rational formula $MgSO_4.5Mg(OH)_2.3H_2O$ is important as reinforcing material for synthetic resins, the water of crystallization in the formula of removed at an elevated molding temperature, thus entailing the production of defective moldings. The fibrous anhydrides magnesium oxysulfate of the present invention exhibits various functions as reinforcing material equal to those of the above fibrous magnesium oxysulfate without producing such defective moldings caused by a dehydration reaction.

The process for the preparation of fibrous anhydrous magnesium oxysulfate of the present invention may bring about a high yield because it is carried out through the first reaction intermediate product of the formula $2MgSO_4.Mg(OH)_2.3H_2O$ and the second reaction intermediate product of the formula $MgSO_4.5Mg(OH)_2.8H_2O$, and provides an excellent reinforcing material for synthetic resins without causing a production of defective moldings due to a dehydration reaction.

We claim:

1. A fibrous anhydrous magnesium oxysulfate having a formula of $MgSO_4.5Mg(OH)_2$.

2. A fibrous anhydrous magnesium oxysulfate as set forth in claim 1, and having a length of several to 1000 μ.

3. A fibrous anhydrous magnesium oxysulfate as set forth in claim 1, having a diameter of 0.07 to 7 μ.

4. A fibrous anhydrous magnesium oxysulfate as set forth in claim 1, having an apparent density of 0.05 to 0.3 g/cm³.

5. A fibrous anhydrous magnesium oxysulfate as set forth in claim 1, and having a BET specific surface area of not greater than 30 m²/g.

6. A process for the preparation of a fibrous anhydrous magnesium oxysulfate having the formula of $MgSO_4.5Mg(OH)_2$, comprising the steps of:

preparing a magnesium oxysulfate having a formula of $2MgSO4.Mg(OH)2.3H2O$ by dispersing magnesium hydroxide or magnesium oxide into an aqueous solution of magnesium sulfate having a concentration of 1.5 to 5.0 mol/l and then subjecting the dispersion to a hydrothermal reaction carried out at a temperature of 100° to 200° C. and under a pressure of 1 to 15 kg/cm² for 0.1 to 5 hours;

cooling and diluting, with water or an aqueous solution of magnesium sulfate, a slurry of said magnesium oxysulfate having a formula of $2MgSO_4.Mg(OH)_2.3H_2O$ to a concentration of 0.5 to 2.5 mol/l of the aqueous solution of magnesium sulfate and to a temperature of 10° to 60° C. to thereby decompose the $2MgSO_4.Mg(OH)_2.3H_2O$ and produce fibrous magnesium oxysulfate having a formula of $MgSO_4.5Mg(OH)_2.8H_2O$; and heat treating the fibrous magnesium oxysulfate having a formula of $MgSO_4Mg(OH)_2.8H_2O$ to obtain the fibrous anhydrous magnesium oxysulfate having the formula of $MgSO_4.5Mg(OH)_2$.

7. A process according to claim 6, wherein the magnesium hydroxide or magnesium oxide is dispersed into the aqueous solution of magnesium sulfate at a concentration of not higher than 10% by weight.

8. A process according to claim 6, wherein the hydrothermal reaction is carried out at a temperature of 100° to 200° C. and under a pressure of 1 to 15 kg/cm².

9. A process according to claim 6, wherein the magnesium oxysulfate having a formula of $2MgSO_4 \cdot Mg(OH)_2 \cdot 3H_2O$ is allowed to decompose for 2 to 10 hours.

10. A process according to claim 6, wherein the magnesium oxysulfate having a formula of $2MgSO_4 \cdot Mg(OH)_2 \cdot 3H_2O$ is allowed to decompose for 1 to 5 hours in the presence of seed crystals.

11. A process according to claim 6, wherein the heat treatment of the fibrous magnesium oxysulfate having a formula of $MgSO_4 \cdot 5Mg(OH)_2 \cdot 8H_2O$ is carried out at a temperature of 160° to 350° C. for 0.5 to 10 hours.

* * * * *

UNITED STATES PATENT AND TRADEMARK OFFICE
CERTIFICATE OF CORRECTION

PATENT NO. : 5,326,548
DATED : July 5, 1994
INVENTOR(S) : Satoshi OTAKA et al.

It is certified that error appears in the above-indentified patent and that said Letters Patent is hereby corrected as shown below:

In the Abstract, line 14, "$MgSO_4 \cdot 5Mg(OH)_2 \cdot 8H_2$" should read --$MgSO_4 \cdot 5Mg(OH)_2 \cdot 8H_2O$--;

Signed and Sealed this

Fourth Day of October, 1994

Attest:

BRUCE LEHMAN

Attesting Officer

Commissioner of Patents and Trademarks